US012119163B2

(12) United States Patent
Oka

(10) Patent No.: US 12,119,163 B2
(45) Date of Patent: Oct. 15, 2024

(54) INDUCTOR

(71) Applicant: TOKIN CORPORATION, Sendai (JP)

(72) Inventor: Toshiaki Oka, Tokyo (JP)

(73) Assignee: TOKIN CORPORATION, Shiroishi (JP)

( * ) Notice: Subject to any disclaimer, the term of this patent is extended or adjusted under 35 U.S.C. 154(b) by 784 days.

(21) Appl. No.: 16/923,156

(22) Filed: Jul. 8, 2020

(65) Prior Publication Data

US 2021/0020356 A1 Jan. 21, 2021

(30) Foreign Application Priority Data

Jul. 18, 2019 (JP) ................................ 2019-132807

(51) Int. Cl.
*H01F 27/29* (2006.01)
*H01F 17/04* (2006.01)
*H01F 27/24* (2006.01)

(52) U.S. Cl.
CPC ............ *H01F 27/29* (2013.01); *H01F 17/04* (2013.01); *H01F 27/24* (2013.01)

(58) Field of Classification Search
CPC .......... H01F 27/29; H01F 17/04; H01F 27/24; H01F 27/2847; H01F 27/306; H01F 17/043; H01F 27/28; H01F 27/02
See application file for complete search history.

(56) References Cited

U.S. PATENT DOCUMENTS 7,187,263 B2 * 3/2007 Vinciarelli .......... H01F 27/2804 336/200
2018/0061547 A1 * 3/2018 Hanson .................. H01F 27/28
2020/0035413 A1 1/2020 Hanson et al.

FOREIGN PATENT DOCUMENTS

JP S54(1979)064945 * 5/1979
JP S54064945 U 5/1979
JP 2003282333 A 10/2003
JP 2004197218 A 7/2004
JP 2018125527 A * 8/2018 ......... H01F 17/0013

* cited by examiner

*Primary Examiner* — Malcolm Barnes
(74) *Attorney, Agent, or Firm* — Holtz, Holtz & Volek PC

(57) ABSTRACT

An inductor comprises a core and a coil. The coil has a first terminal, a second terminal, a first portion, a second portion, a third portion, a first coupling portion, a second coupling portion, a first extending portion and a second extending portion. Each of the first portion and the second portion is positioned apart from a first edge of the core. Each of the first portion and the second portion is parallel to the first edge. Each of the first portion and the second portion is positioned apart from the third portion in a first horizontal direction. The third portion is positioned apart from a second edge of the core. The third portion is parallel to the second edge. The first extending portion couples the first portion and the third portion with each other. The second extending portion couples the second portion and the third portion with each other.

6 Claims, 7 Drawing Sheets

INDUCTOR

CROSS REFERENCE TO RELATED APPLICATIONS

This application is based on and claims priority under 35 U.S.C. § 119 to Japanese Patent Application No. JP2019-132807 filed Jul. 18, 2019, the contents of which are incorporated herein in their entirety by reference.

BACKGROUND OF THE INVENTION

This invention relates to an inductor comprising a core and a coil.

JPA2004-197218 (Patent Document 1) discloses an inductor of this type. In detail, Patent Document 1 discloses an inductor 892 and an inductor 900. As shown in FIG. 12, the inductor 892 comprises a coil 894 and a core 896. Specifically, the coil 894 is wound around an axis parallel to a Z-direction and is fully embedded in the core 896. As shown in FIG. 13, the inductor 900 comprises a coil 910 and a core 920. Specifically, the coil 910 has a meander shape in a plane perpendicular to the Z-direction and is fully embedded in the core 920. The inductor 900 of FIG. 13 itself has a reduced height as compared with the inductor 892 of FIG. 12.

SUMMARY OF THE INVENTION

It is therefore an object of the present invention to provide an inductor which has improved electromagnetic characteristics while itself having a reduced height.

One aspect of the present invention provides an inductor comprising a core and a coil. The core has a first edge and a second edge. The first edge and the second edge are positioned apart from each other in a first horizontal direction. The coil has a first terminal, a second terminal, a first portion, a second portion, a third portion, a first coupling portion, a second coupling portion, a first extending portion and a second extending portion. The first terminal and the second terminal are positioned apart from each other in a second horizontal direction perpendicular to the first horizontal direction. Each of the first portion and the second portion is positioned apart from the first edge. Each of the first portion and the second portion is parallel to the first edge. Each of the first portion and the second portion is positioned apart from the third portion in the first horizontal direction. The first portion has a size in the second horizontal direction. The second portion has a size in the second horizontal direction. The third portion has a size in the second horizontal direction. Each of the sizes of the first portion and the second portion is smaller than the size of the third portion. The third portion is positioned apart from the second edge. The third portion is parallel to the second edge. The first coupling portion couples the first terminal and the first portion with each other. The second coupling portion couples the second terminal and the second portion with each other. The first extending portion couples the first portion and the third portion with each other. The second extending portion couples the second portion and the third portion with each other. All of the first portion, the second portion, the third portion, the first coupling portion, the second coupling portion, the first extending portion and the second extending portion are fully embedded in the core.

The inductor of the present invention is configured as follows: each of the first portion and the second portion of the coil is positioned apart from the first edge of the core and is parallel to the first edge of the core; each of the first portion and the second portion of the coil is positioned apart from the third portion of the coil in the first horizontal direction; and the third portion of the coil is positioned apart from the second edge of the core and is parallel to the second edge of the core. Thus, the inductor of the present invention can have improved electromagnetic characteristics while itself having a reduced height.

Additionally, the inductor of the present invention is configured as follows: the first extending portion couples the first portion and the third portion with each other; the second extending portion couples the second portion and the third portion with each other; and each of the sizes of the first portion and the second portion in the second horizontal direction is smaller than the size of the third portion in the second horizontal direction. Accordingly, the inductor of the present invention can have an enlarged area which is surrounded by the third portion, the first extending portion and the second extending portion in the core, so that the core is effectively magnetized when the coil is energized. Thus, the inductor of the present invention can have improved electromagnetic characteristics.

An appreciation of the objectives of the present invention and a more complete understanding of its structure may be had by studying the following description of the preferred embodiment and by referring to the accompanying drawings.

Figure 1:
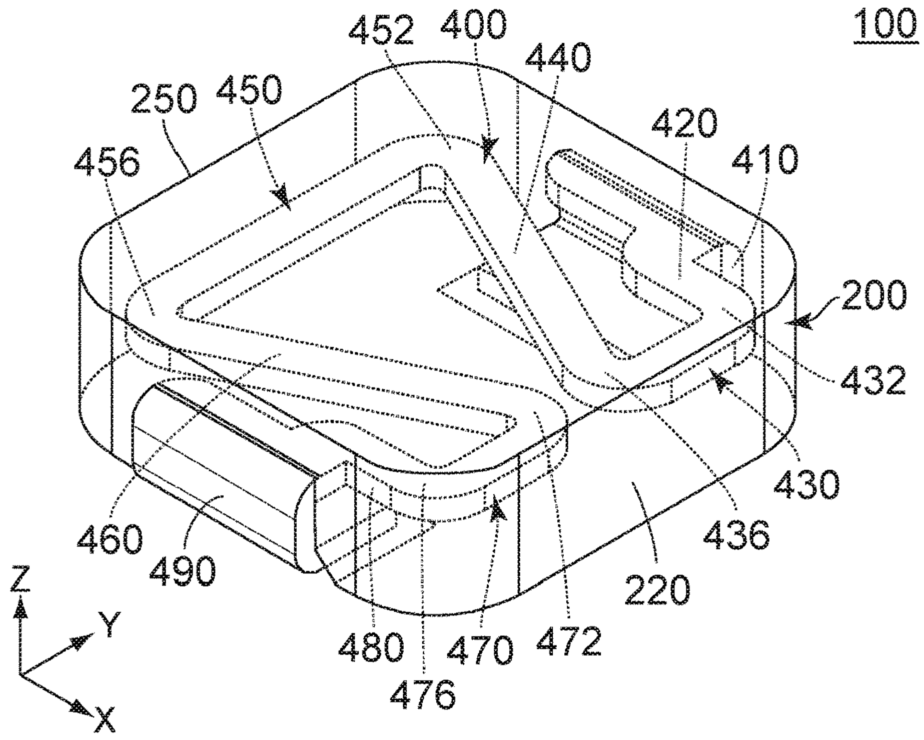
FIG. 1 is a perspective view showing an inductor of a first embodiment of the present invention. In the figure, a part of the inductor, which is hidden by a core, is illustrated by dotted line.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

First Embodiment

As shown in FIG. 1, an inductor 100 according to a first embodiment of the present invention comprises a core 200 and a coil 400.

Figure 2:
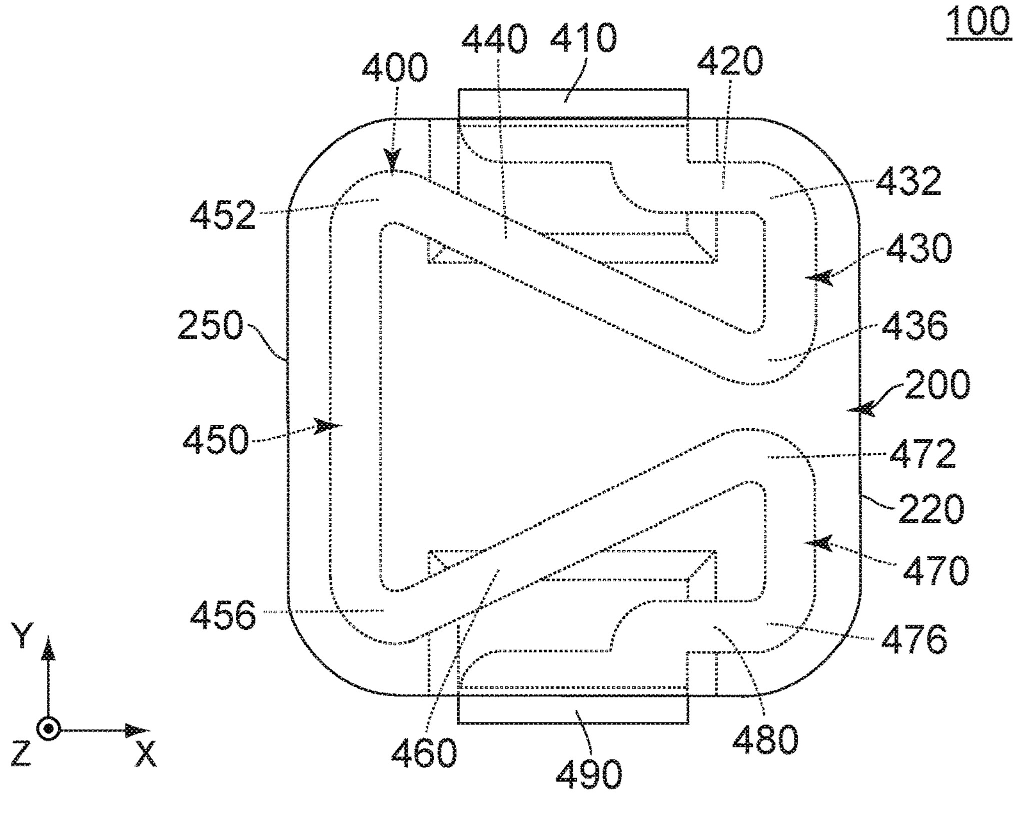
FIG. 2 is a top view showing the inductor of FIG. 1. In the figure, the part of the inductor, which is hidden by the core, is illustrated by dotted line.

Referring to FIG. 2, the core 200 of the present embodiment is a dust core. More specifically, the core 200 is formed by compression molding a mixture of a soft magnetic powder and a binder. The soft magnetic powder included in the core 200 is an insulated iron-based powder or an insulated ferrite powder. However, the present invention is not limited thereto. The core 200 may be formed by any manufacturing method, for example by adhering a plurality of soft magnetic members to one another.

As shown in FIG. 2, the core 200 of the present embodiment has a substantially square cylinder extending in an up-down direction. The core 200 has a rectangular shape with rounded corners when viewed along the up-down direction. In the present invention, the up-down direction is a Z-direction. Specifically, it is assumed that up-down direction is a positive Z-direction while downward is a negative Z-direction. The core 200 has a first edge 220 and a second edge 250.

As shown in FIG. 2, the first edge 220 of the present embodiment is one of end portions of the core 200 in a first horizontal direction. In the present embodiment, the first horizontal direction is an X-direction. The first edge 220 forms a side of the rounded rectangular shape of the core 200. More specifically, the first edge 220 forms a side of the rounded rectangular shape of the core 200 in the positive X-direction. The first edge 220 is positioned beyond the second edge 250 in the positive X-direction of the first horizontal direction. The first edge 220 extends along a second horizontal direction. In the present embodiment, the second horizontal direction is a Y-direction.

As shown in FIG. 2, the second edge 250 of the present embodiment is a remaining one of the end portions of the core 200 in the first horizontal direction. The second edge 250 forms another side of the rounded rectangular shape of the core 200. More specifically, the second edge 250 forms a side of the rounded rectangular shape of the core 200 in the negative X-direction. The second edge 250 extends along the second horizontal direction.

As shown FIG. 2, the first edge 220 and the second edge 250 are positioned apart from each other in the first horizontal direction. The first edge 220 and the second edge 250 extend parallel to each other. More specifically, the first edge 220 and the second edge 250 extend parallel to each other along the second horizontal direction.

Figure 6:
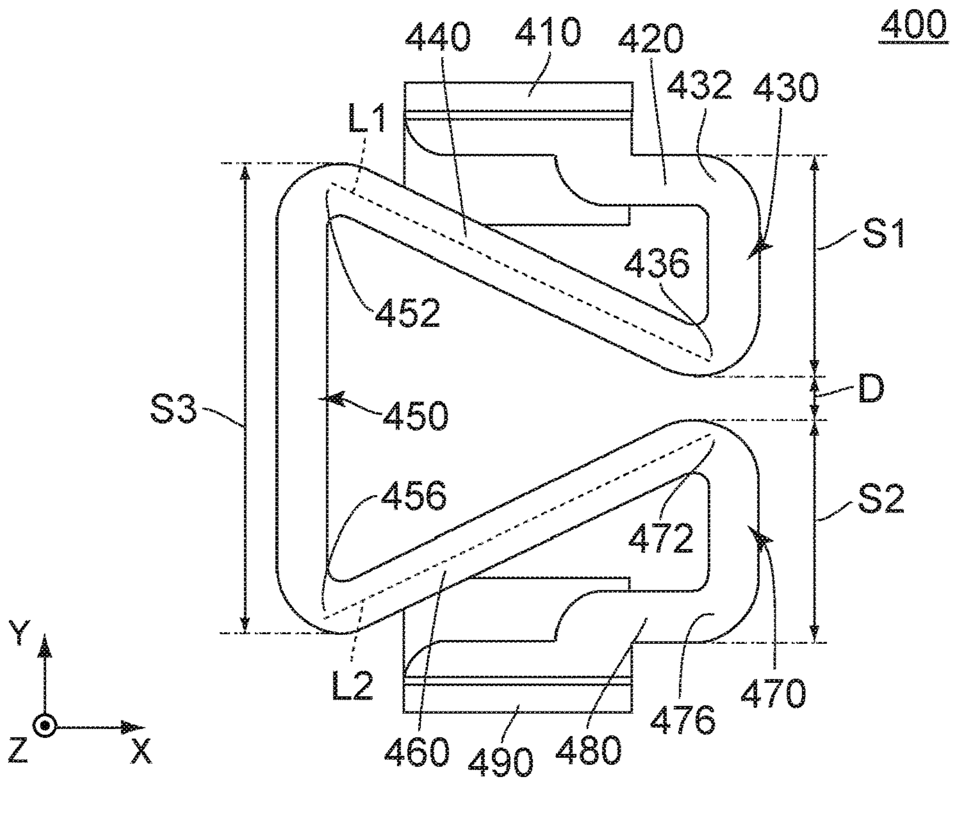
FIG. 6 is a top view showing the coil of FIG. 5.

As shown in FIG. 6, the coil 400 of the present embodiment is a single-turn coil made of copper. The coil 400 has a first terminal 410, a first coupling portion 420, a first portion 430, a first extending portion 440, a third portion 450, a second extending portion 460, a second portion 470, a second coupling portion 480 and a second terminal 490.

As shown in FIG. 2, the first terminal 410 of the present embodiment is exposed outside the core 200. The first terminal 410 is provided on a side of the rounded rectangular shape of the core 200 in the positive Y-direction.

Figure 5:
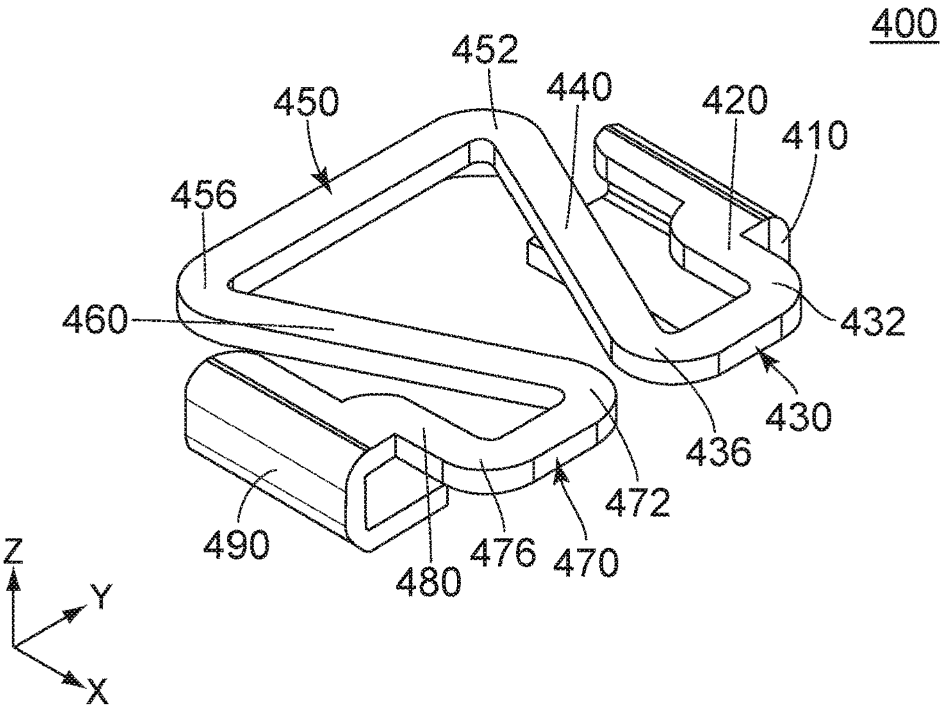
FIG. 5 is a perspective view showing a coil which is included in the inductor of FIG. 1.

As shown in FIG. 5, the first coupling portion 420 of the present embodiment is perpendicular to the up-down direction. The first coupling portion 420 has a flat-plate shape extending in the first horizontal direction. The first coupling portion 420 couples the first terminal 410 and the first portion 430 with each other.

Figure 3:
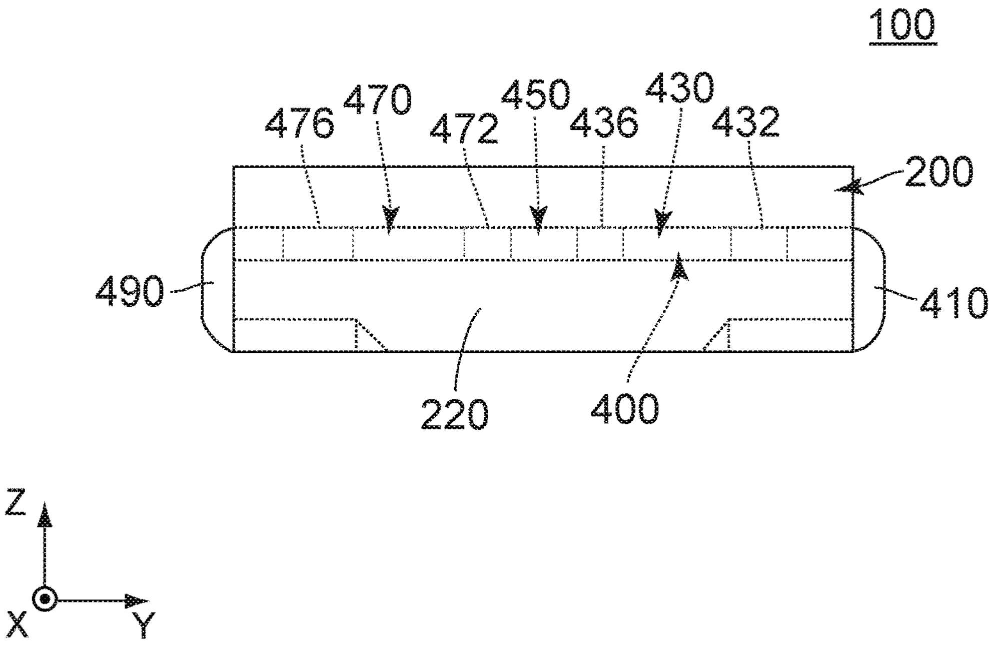
FIG. 3 is a front view showing the inductor of FIG. 1. In the figure, the part of the inductor, which is hidden by the core, is illustrated by dotted line.

As understood from FIG. 3, the first portion 430 of the present embodiment is perpendicular to the up-down direction. As shown in FIG. 6, the first portion 430 has a flat-plate shape extending in the second horizontal direction. The first portion 430 is positioned beyond the second portion 470 in the positive Y-direction of the second horizontal direction. As shown in FIG. 2, the first portion 430 is positioned apart from the first edge 220 and is parallel to the first edge 220. More specifically, over the full length of the first portion 430, the first portion 430 is positioned apart from the first edge 220 and is parallel to the first edge 220. The first portion 430 is positioned apart from the third portion 450 in the first horizontal direction. The first portion 430 has a first outer end portion 432 and a first inner end portion 436.

As shown in FIG. 6, the first outer end portion 432 of the present embodiment is an outer end of the first portion 430 in the second horizontal direction. In other words, the first outer end portion 432 is an end of the first portion 430 in the positive Y-direction of the second horizontal direction. The first outer end portion 432 is coupled with the first terminal 410 by the first coupling portion 420. In other words, the first coupling portion 420 couples the first outer end portion 432 and the first terminal 410 with each other.

As shown in FIG. 6, the first inner end portion 436 of the present embodiment is an inner end of the first portion 430 in the second horizontal direction. In other words, the first inner end portion 436 is an end of the first portion 430 in the negative Y-direction of the second horizontal direction.

As shown in FIG. 5, the first extending portion 440 of the present embodiment is perpendicular to the up-down direction. The first extending portion 440 has a flat-plate shape extending in a direction which intersects with both the first horizontal direction and the second horizontal direction. However, the present invention is not limited thereto. The first extending portion 440 may be modified, provided that the first extending portion 440 extends, at least in part, in a direction intersecting with the first horizontal direction. The first extending portion 440 couples the first portion 430 and the third portion 450 with each other.

As shown in FIG. 5, the third portion 450 of the present embodiment is perpendicular to the up-down direction. The third portion 450 has a flat-plate shape extending in the second horizontal direction. As shown in FIG. 2, the third portion 450 is positioned apart from the second edge 250 and is parallel to the second edge 250. More specifically, over the full length of the third portion 450, the third portion 450 is positioned apart from the second edge 250 and is parallel to the second edge 250. As shown in FIG. 6, in the second horizontal direction, a size S3 of the third portion 450 is greater than a size S1 of the first portion 430. In other words, in the second horizontal direction, the size S1 of the first portion 430 is smaller than the size S3 of the third portion 450. The third portion 450 has a first end portion 452 and a second end portion 456.

As shown in FIG. 6, the first end portion 452 of the present embodiment is one of outer ends of the third portion 450 in the second horizontal direction. Specifically, the first end portion 452 is an end of the third portion 450 in the positive Y-direction. The first end portion 452 is coupled with the first inner end portion 436 by the first extending portion 440. In other words, the first extending portion 440 couples the first inner end portion 436 and the first end portion 452 with each other. The first end portion 452 is positioned outward of the first inner end portion 436 in the second horizontal direction. In other words, the first inner end portion 436 is positioned inward of the first end portion 452 in the second horizontal direction.

As shown in FIG. 6, the first extending portion 440 of the present embodiment extends along a first line L1 which connects the first inner end portion 436 and the first end portion 452 with each other. However, the present invention is not limited thereto. The first extending portion 440 may be modified, provided that the first extending portion 440 extends along the first line L1 which connects the first inner end portion 436 and the first end portion 452 with each other, or extends to be bulged outward beyond the first line L1.

As shown in FIG. 5, the second end portion 456 of the present embodiment is a remaining one of the outer ends of the third portion 450 in the second horizontal direction. In other words, the second end portion 456 is an end of the third portion 450 in the negative Y-direction.

As shown in FIG. 5, the second extending portion 460 of the present embodiment is perpendicular to the up-down direction. The second extending portion 460 extends in a direction which intersects with both the first horizontal direction and the second horizontal direction. However, the present invention is not limited thereto. The second extending portion 460 may be modified, provided that the second extending portion 460 extends, at least in part, in a direction intersecting with the first horizontal direction. As shown in FIG. 6, the second extending portion 460 is unparallel to the first extending portion 440. The second extending portion 460 extends in a direction intersecting with a direction in which the first extending portion 440 extends. The second extending portion 460 couples the second portion 470 and the third portion 450 with each other.

As shown in FIG. 5, the second portion 470 of the present embodiment is perpendicular to the up-down direction. The second portion 470 has a flat-plate shape extending in the second horizontal direction. As shown in FIG. 6, the second portion 470 is positioned beyond the first portion 430 in the negative Y-direction. As shown in FIG. 2, the second portion 470 is positioned apart from the first edge 220 and is parallel to the first edge 220. More specifically, over the full length of the second portion 470, the second portion 470 is positioned apart from the first edge 220 and is parallel to the first edge 220. The second portion 470 is positioned apart from the third portion 450 in the first horizontal direction. As shown in FIG. 6 again, in the second horizontal direction, a size S2 of the second portion 470 is smaller than the size S3 of the third portion 450. In the second horizontal direction, a distance D between the first portion 430 and the second portion 470 is smaller than the size S3 of the third portion 450. The second portion 470 has a second inner end portion 472 and a second outer end portion 476.

As shown in FIG. 6, the second inner end portion 472 of the present embodiment is an inner end of the second portion 470 in the second horizontal direction. In other words, the second inner end portion 472 is an end of the second portion 470 in the positive Y-direction of the second horizontal direction. The second inner end portion 472 is coupled with the second end portion 456 by the second extending portion 460. In other words, the second extending portion 460 couples the second inner end portion 472 and the second end portion 456 with each other. The second inner end portion 472 is positioned inward of the second end portion 456 in the second horizontal direction.

As shown in FIG. 6, the second extending portion 460 extends along a second line L2 which connects the second inner end portion 472 and the second end portion 456 with each other. However, the present embodiment is not limited thereto. The second extending portion 460 may be modified, provided that the second extending portion 460 extends along the second line L2 which connects the second inner end portion 472 and the second end portion 456 with each other, or extends to be bulged outward beyond the second line L2.

As shown in FIG. 6, the second outer end portion 476 of the present embodiment is an outer end of the second portion 470 in the second horizontal direction. In other words, the second outer end portion 476 is an end of the second portion 470 in the negative Y-direction of the second horizontal direction.

As shown in FIG. 5, the second coupling portion 480 of the present embodiment is perpendicular to the up-down direction. The second coupling portion 480 has a flat-plate shape extending in the first horizontal direction. As shown in FIG. 6, the second coupling portion 480 couples the second terminal 490 and the second portion 470 with each other. More specifically, the second coupling portion 480 couples the second outer end portion 476 and the second terminal 490 with each other.

As shown in FIG. 2, the second terminal 490 of the present embodiment is exposed outside the core 200. The second terminal 490 is provided on a side of the rounded rectangular shape of the core 200 in the negative Y-direction. The first terminal 410 and the second terminal 490 are positioned apart from each other in the second horizontal direction perpendicular to the first horizontal direction.

Figure 4:
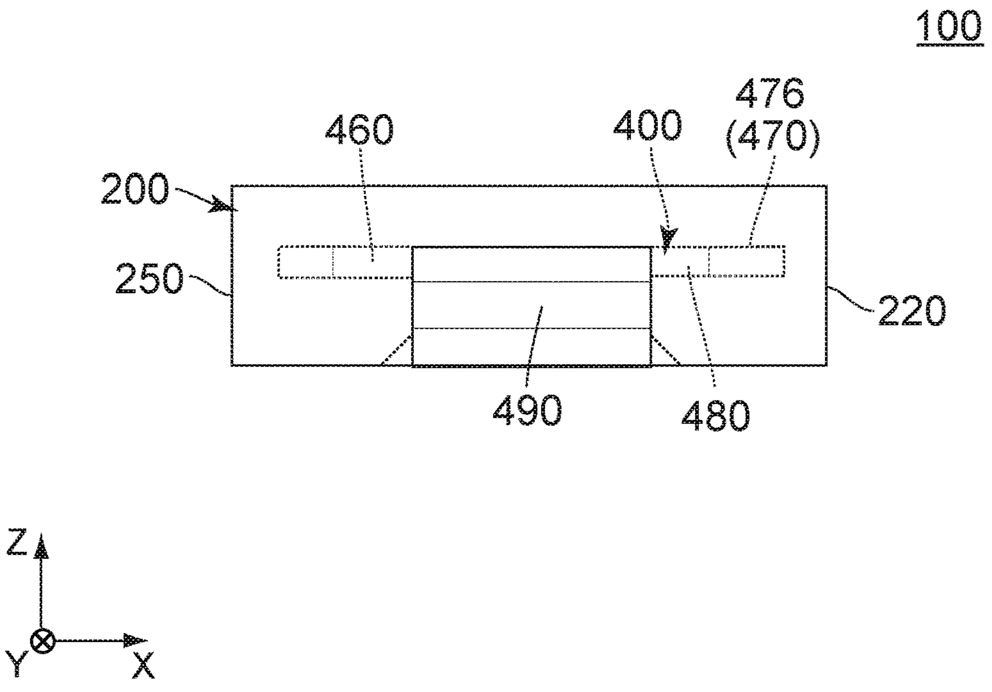
FIG. 4 is a side view showing the inductor of FIG. 1. In the figure, the part of the inductor, which is hidden by the core, is illustrated by dotted line.

As shown in FIGS. 3 and 4, the inductor 100 of the present embodiment is configured so that all of the first portion 430, the second portion 470, the third portion 450, the first coupling portion 420, the second coupling portion 480, the first extending portion 440 and the second extending portion 460 are positioned on a common plane perpendicular to the up-down direction.

As shown in FIGS. 1 and 2, the inductor 100 of the present embodiment is configured so that all of the first portion 430, the second portion 470, the third portion 450, the first coupling portion 420, the second coupling portion 480, the first extending portion 440 and the second extending portion 460 are fully embedded in the core 200.

Second Embodiment

Figure 7:
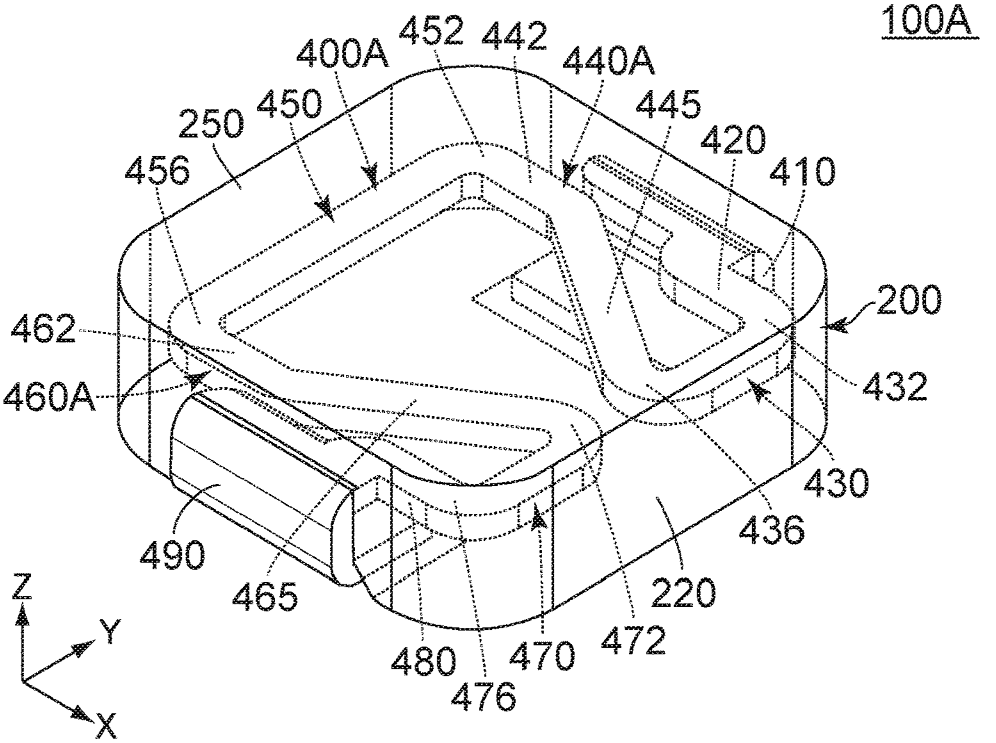
FIG. 7 is a perspective view showing an inductor of a second embodiment of the present invention. In the figure, a part of the inductor, which is hidden by a core, is illustrated by dotted line.
Figure 8:
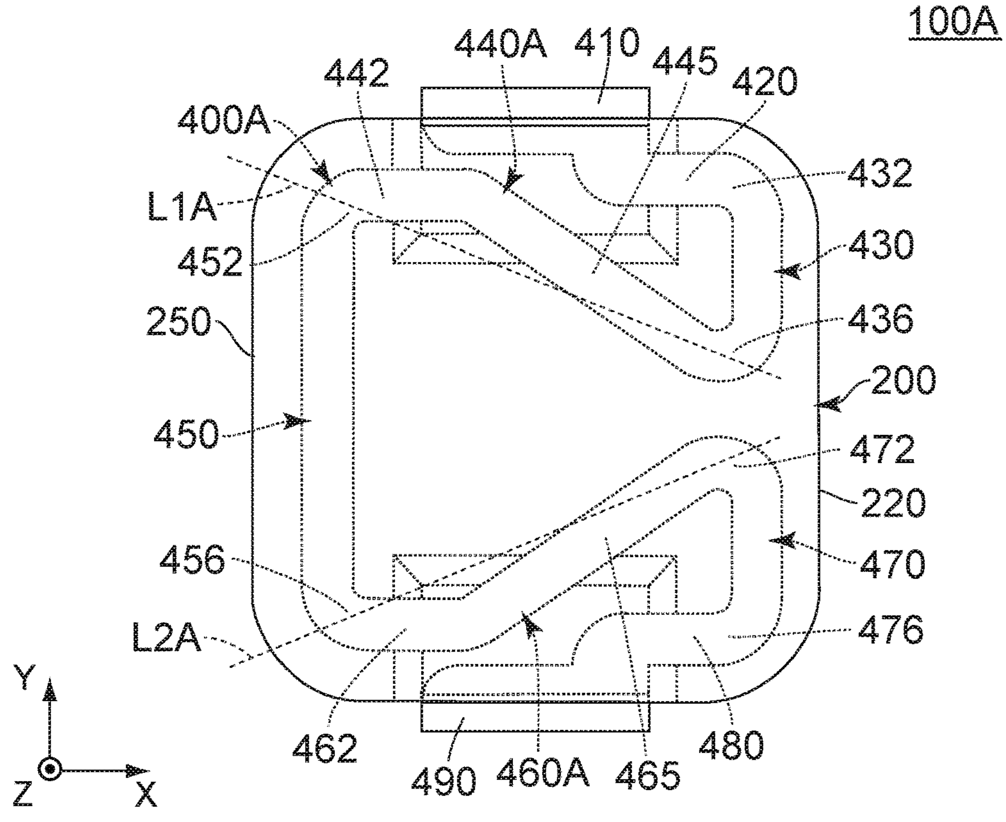
FIG. 8 a top view showing the inductor of FIG. 7. In the figure, the part of the inductor, which is hidden by the core, is illustrated by dotted line.

Referring to FIGS. 7 and 8, an inductor 100A according to a second embodiment of the present invention has a structure similar to that of the inductor 100 (see FIG. 1) of the aforementioned first embodiment. Accordingly, components similar to those of the first embodiment among components shown in FIGS. 7 and 8 will be designated by the same reference numerals as those of the first embodiment. As for directions and orientations in the present embodiment, expressions same as those of the first embodiment will be used hereinbelow.

As shown in FIG. 8, the inductor 100A of the present embodiment comprises a core 200 and a coil 400A. Since the core 200 of the present embodiment has a structure similar to that of the inductor 100 of the first embodiment, a detailed explanation thereabout is omitted.

Similar to the coil 400 of the first embodiment, the coil 400A of the present embodiment shown in FIG. 8 is a single-turn coil made of copper. More specifically, the coil 400A has a first terminal 410, a second terminal 490, a first portion 430, a second portion 470, a third portion 450, a first coupling portion 420, a second coupling portion 480, a first extending portion 440A and a second extending portion 460A. The components of the coil 400A of the present embodiment except for the first extending portion 440A and the second extending portion 460A has structures same as those of the coil 400 of the first embodiment. Accordingly, a detailed explanation thereabout is omitted.

As shown in FIG. 7, the first extending portion 440A of the present embodiment has a flat-plate shape perpendicular to the up-down direction. The first extending portion 440A couples the first portion 430 and the third portion 450 with each other. More specifically, the first extending portion 440A couples a first inner end portion 436 and a first end portion 452 with each other.

As shown in FIG. 8, the first extending portion 440A of the present embodiment extends to be bulged outward beyond a first line L1A which connects the first inner end portion 436 and the first end portion 452 with each other. The first extending portion 440A has a linear portion 442 and an oblique portion 445.

As shown in FIG. 8, the linear portion 442 of the present embodiment is perpendicular to the up-down direction. The linear portion 442 has a flat-plate shape extending in the first horizontal direction. The linear portion 442 is coupled with the first end portion 452 of the third portion 450.

As shown in FIG. 7, the oblique portion 445 of the present embodiment is perpendicular to the up-down direction. As shown in FIG. 8, the oblique portion 445 has a flat-plate shape intersecting with both the first horizontal direction and the second horizontal direction. The oblique portion 445 is coupled with the linear portion 442. The oblique portion 445 is coupled with the first inner end portion 436 of the first portion 430.

As shown in FIG. 7, the second extending portion 460A of the present embodiment has a flat-plate shape perpendicular to the up-down direction. As shown in FIG. 8, the second extending portion 460A is unparallel to the first extending portion 440A. The second extending portion 460A couples the second portion 470 and the third portion 450 with each other. More specifically, the second extending portion 460A couples a second inner end portion 472 and a second end portion 456 with each other.

As shown in FIG. 8, the second extending portion 460A extends to be bulged outward beyond a second line L2A which connects the second inner end portion 472 and the second end portion 456 with each other. The second extending portion 460A has a linear portion 462 and an oblique portion 465.

As shown in FIG. 7, the linear portion 462 of the present embodiment is perpendicular to the up-down direction. The linear portion 462 has a flat-plate shape extending in the first horizontal direction. The linear portion 462 is coupled with the second end portion 456 of the third portion 450. As shown in FIG. 8, the linear portion 462 of the second extending portion 460A and the linear portion 442 of the first extending portion 440A are parallel to each other.

As shown in FIG. 7, the oblique portion 465 of the present embodiment is perpendicular to the up-down direction. As shown in FIG. 8, the oblique portion 445 has a flat-plate shape intersecting with both the first horizontal direction and the second horizontal direction. The oblique portion 465 of the second extending portion 460A is unparallel to the oblique portion 445 of the first extending portion 440A. The oblique portion 465 of the second extending portion 460A extends in a direction intersecting with a direction in which the oblique portion 445 of the first extending portion 440A extends. The oblique portion 465 is coupled with the linear portion 462. The oblique portion 465 is coupled with the second inner end portion 472 of the second portion 470.

Referring to FIG. 7, the inductor 100A of the present embodiment is configured so that all of the first portion 430, the second portion 470, the third portion 450, the first coupling portion 420, the second coupling portion 480, the first extending portion 440A and the second extending portion 460A are positioned on a common plane perpendicular to the up-down direction.

As shown in FIG. 8, the inductor 100A of the present embodiment is configured so that all of the first portion 430, the second portion 470, the third portion 450, the first coupling portion 420, the second coupling portion 480, the first extending portion 440A and the second extending portion 460A are fully embedded in the core 200.

[DC Bias Characteristics]

Figure 10:
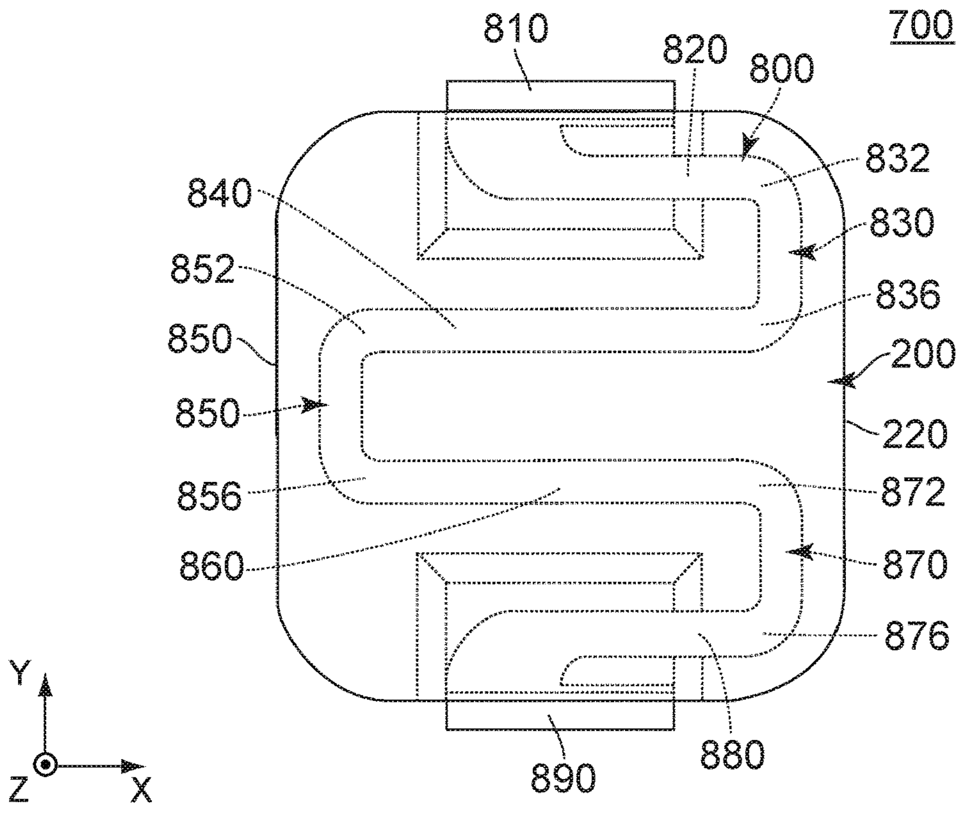
FIG. 10 is a top view showing the inductor of FIG. 9. In the figure, the part of the inductor, which is hidden by the core, is illustrated by dotted line.
Figure 11:
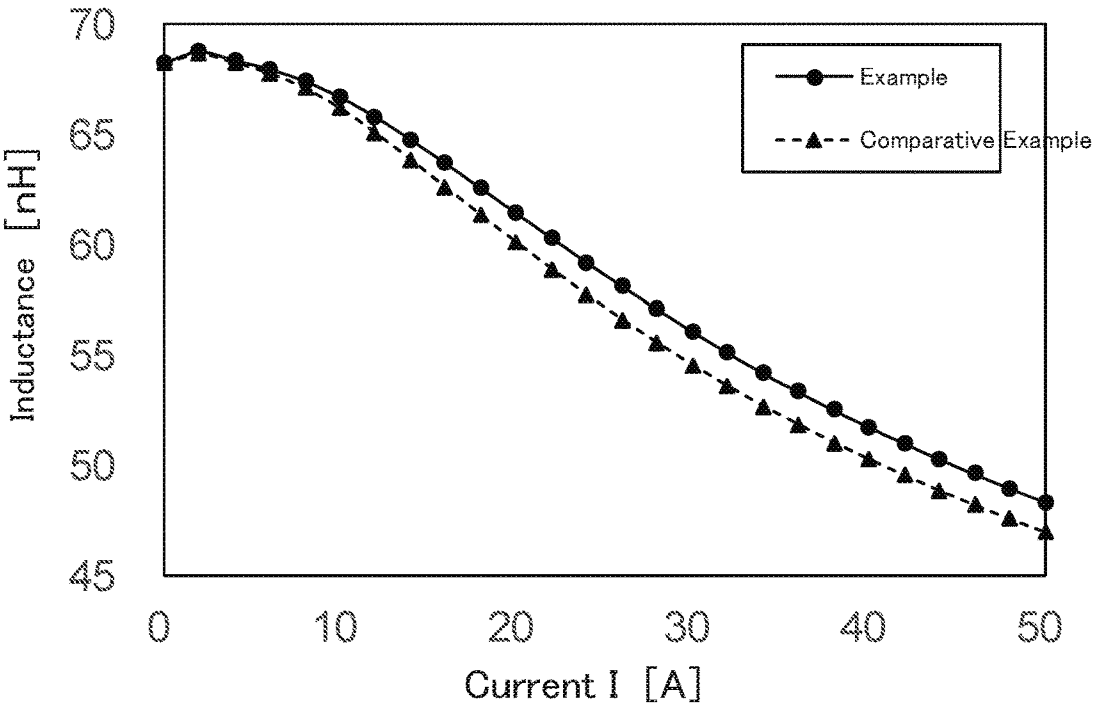
FIG. 11 is a graph showing DC bias characteristics of Example and Comparative Example.
Figure 12:
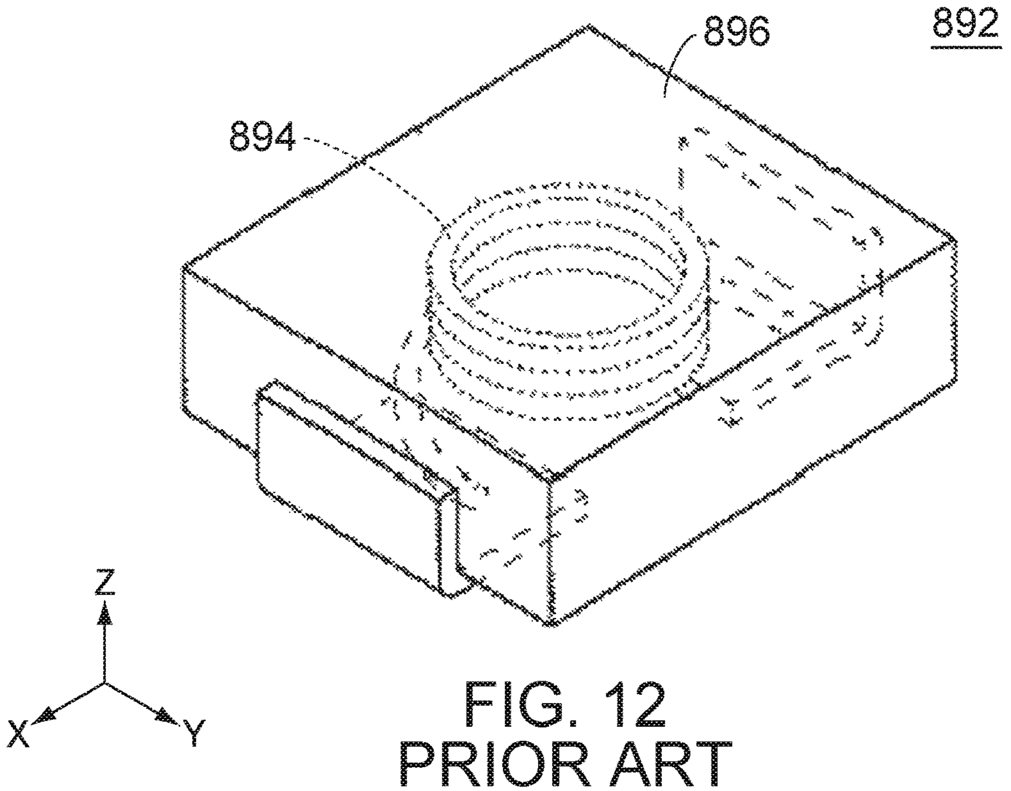
FIG. 12 PRIOR ART
FIG. 12 is a perspective view showing an inductor of Patent Document 1. In the figure, a part of the inductor, which is hidden by a core, is illustrated by dotted line.
Figure 13:
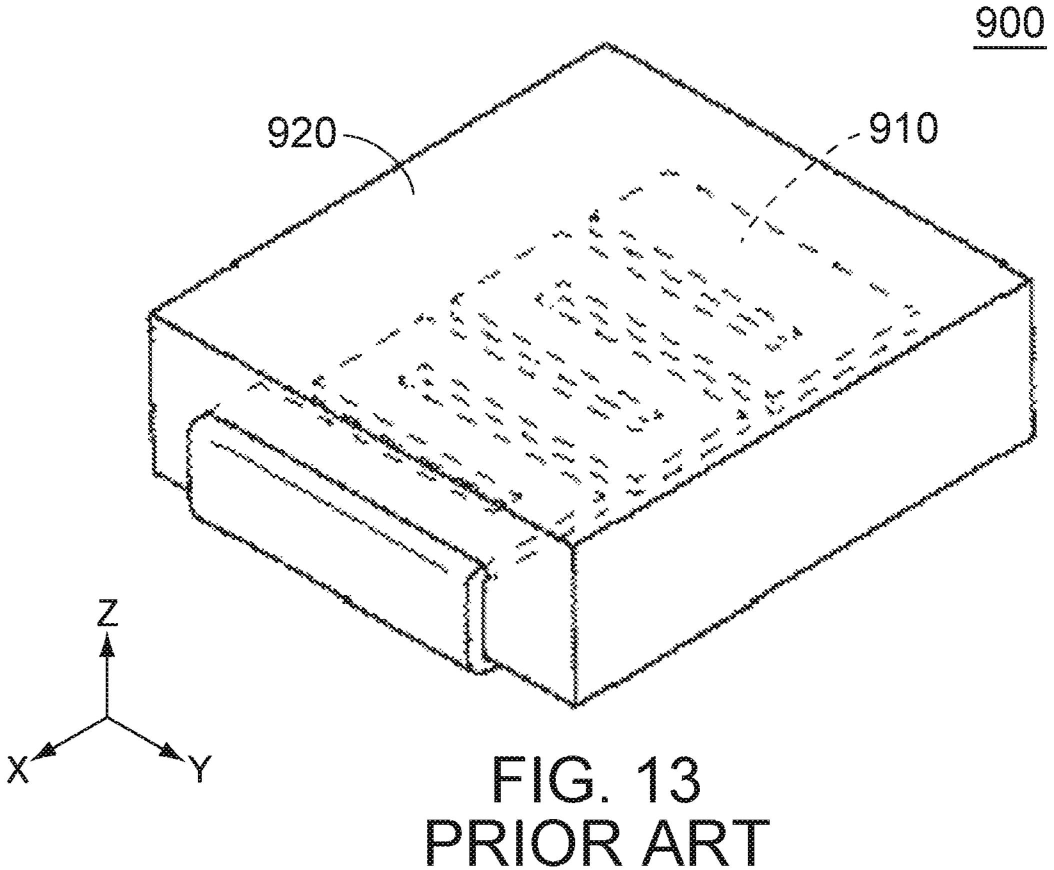
FIG. 13 PRIOR ART
FIG. 13 is a perspective view showing another inductor of Patent Document 1. In the figure, a part of the inductor, which is hidden by a core, is illustrated by dotted line.

Referring to FIG. 11, DC bias characteristics of the inductor 100 (see FIG. 1) of Example and the inductor 700 (see FIGS. 9 and 10) of Comparative Example are explained as below.

Referring to FIGS. 1, 2 and 6, the inductor 100 of Example is manufactured as follows. First, a blank, which becomes the coil 400, is punched out from a single copper plate having a thickness of 0.2 mm. Next, the blank is placed in soft magnetic powder so that a part of the blank, which becomes the coil 400 excluding the first terminal 410 and the second terminal 490, is fully embedded in the soft magnetic powder. Then, the soft magnetic powder is compression molded in the up-down direction, so that the core 200, in which a part of the coil 400 having a width of 0.3 mm is fully embedded, is formed. The core 200 has a substantially square cylinder with sizes of 4 mm in the first horizontal direction, 4 mm in the second horizontal direction, and 1.2 mm in the up-down direction. The first portion 430 has a size S1 of 1.5 mm in the second horizontal direction. The second portion 470 has a size S2 of 1.5 mm in the second horizontal direction. The third portion 450 has a size S3 of 3.3 mm in the second horizontal direction. Specifically, in the second horizontal direction, each of the size S1 of the first portion 430 and the size S2 of the second portion 470 is smaller than the size S3 of the third portion 450. The distance D between the first portion 430 and the second portion 470 in the second horizontal direction is 0.3 mm. Specifically, in the second horizontal direction, the distance D between the first portion 430 and the second portion 470 is smaller than the size S3 of the third portion 450. Each of the first portion 430 and the second portion 470 is positioned apart from the first edge 220 of the core 200 by 0.3 mm. The third portion 450 is positioned apart from the second edge 250 of the core 200 by 0.3 mm. The first portion 430, the first extending portion 440, the third portion 450, the second extending portion 460 and the second portion 470 are arranged at the middle of the core 200 in the up-down direction. After the core 200 is formed by the compression molding of the soft magnetic powder, parts of the blank, which are exposed outside the core 200 and which become the first terminal 410 and the second terminal 490, are bent downward so that the first terminal 410 and the second terminal 490 each having a size of 1.6 mm in the first horizontal direction are formed. Thus, the inductor 100 of Example is manufactured.

Except that a coil 800 of Comparative Example has a shape different from that of the coil 400 of Example, the inductor 700 of Comparative Example is manufactured in a manner similar to that of the inductor 100 of Example.

Figure 9:
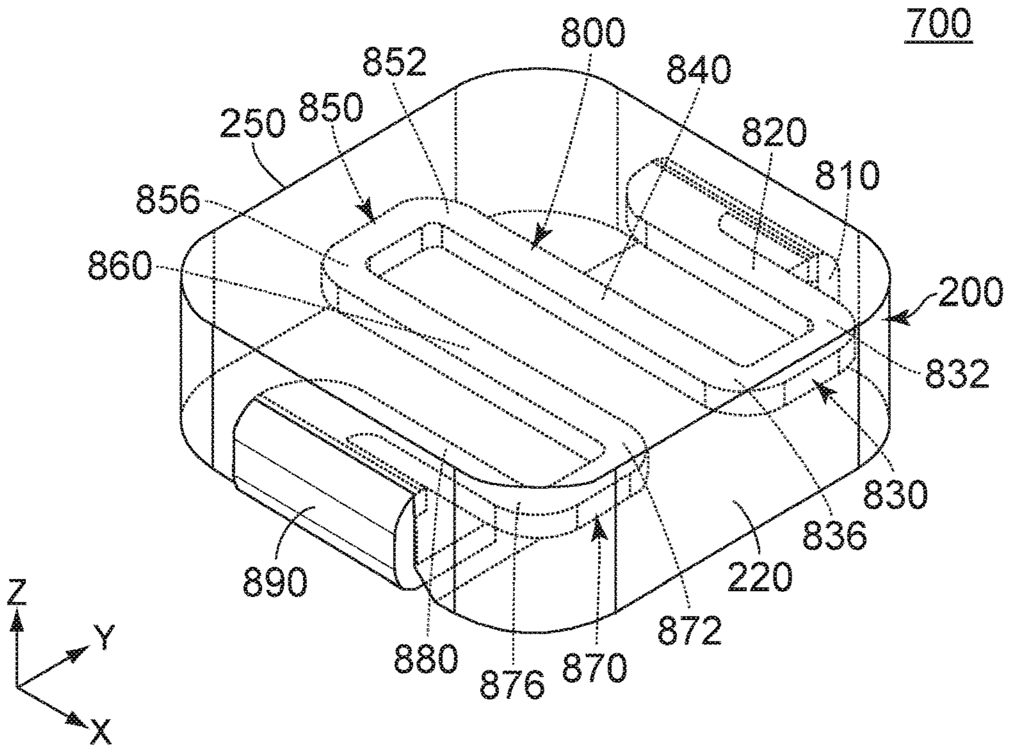
FIG. 9 is a perspective view showing an inductor of Comparative Example. In the figure, a part of the inductor, which is hidden by a core, is illustrated by dotted line.

More specifically, referring to FIGS. 9 and 10, the inductor 700 of Comparative Example comprises a core 200 and the coil 800. The core 200 of the inductor 700 of Comparative Example has a structure similar to that of the core 200 of the inductor 100 of Example. The coil 800 has a first terminal 810, a second terminal 890, a first portion 830, a second portion 870, a third portion 850, a first coupling portion 820, a second coupling portion 880, a first extending portion 840 and a second extending portion 860. The first terminal 810, the second terminal 890, the first coupling portion 820 and the second coupling portion 880 has structures similar to those of the first terminal 410, the second terminal 490, the first coupling portion 420 and the second coupling portion 480 of the coil 400 of the inductor 100 of Example. In the coil 800, each of the first portion 830 and the second portion 870 has a size of 1.3 mm in the second horizontal direction while the third portion 850 has a size of 1.3 mm in the second horizontal direction. In other words, the size of each of the first portion 830 and the second portion 870 in the second horizontal direction is equal to the size of the third portion 850 in the second horizontal direction. Each of the first portion 830 and the second portion 870 is positioned apart from a first edge 220 of the core 200 by 0.3 mm. The third portion 450 is positioned apart from a second edge 250 by 0.3 mm. The first portion 830, the first extending portion 840, the third portion 850, the second extending portion 860 and the second portion 870 are arranged at the middle of the core 200 in the up-down direction.

Referring to FIGS. 9 and 10, the first portion 830 has a first outer end portion 832 and a first inner end portion 836. The second portion 870 has a second outer end portion 876 and a second inner end portion 872. The third portion 850 has a first end portion 852 and a second end portion 856. Dissimilar to the inductor 100 of Example, the first inner end portion 836 is positioned at a position same as that of the first end portion 852 in the second horizontal direction while the second inner end portion 872 is positioned at a position same as that of the second end portion 856 in the second horizontal direction. The first extending portion 840 couples the first inner end portion 836 and the first end portion 852 with each other. The second extending portion 860 couples the second inner end portion 872 and the second end portion 856 with each other. Dissimilar to the first extending portion 440 and the second extending portion 460 of the coil 400 of the inductor 100 of Example, each of the first extending portion 840 and the second extending portion 860 extends along the first horizontal direction. Specifically, the first extending portion 840 and the second extending portion 860 extend parallel to each other over the full length of any of the first extending portion 840 and the second extending portion 860.

FIG. 11 shows the DC bias characteristics of the inductor 100 of Example and the inductor 700 of Comparative Example. As understood from FIG. 11, the inductor 100 of Example has, at a rated current of 33 A, an inductance value which is 20% smaller than an initial inductance value, while the inductor 700 of Comparative Example has, at a rated current of 30 A, an inductance value which is 20% smaller than an initial inductance value. Thus, the inductor 100 of Example has excellent DC bias characteristics as compared with the inductor 700 of Comparative Example.

Although the specific explanation about the present invention is made above referring to the embodiments, the present invention is not limited thereto and is susceptible to various modifications and alternative forms.

Although the core 200 of the inductor 100, 100A of the present embodiment has the substantially square cylinder, the present invention is not limited thereto. Specifically, the core 200 may have a cylindrical shape or the like, provided that each of the first portion 430 and the second portion 470 of the coil 400, 400A is parallel to the first edge 220 of the core 200 while the third portion 450 of the coil 400, 400A is parallel to the second edge 250 of the core 200.

Although the coil 400, 400A of the inductor 100, 100A of the present embodiment is the single-turn coil, the present invention is not limited thereto. The coil 400, 400A may be a multiple-turn coil. Specifically, the coil 400, 400A may be modified as follows: the third portion 450 is divided into two parts; the third portion 450 is provided with a loop which is bulged inward of the core 200; and the loop couples the two parts with each other.

Although the coil 400A of the inductor 100A of the present embodiment has the oblique portions 445 and 465, the present invention is not limited thereto. Specifically, instead of the oblique portion 445, 465, the coil 400A of the inductor 100A may have two connecting portions, wherein: each of the two connecting portions has a staircase-shape when viewed along the up-down direction; and the two connecting portions are unparallel to each other over the full length of any of the two connecting portions.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An inductor comprising a core and a coil, wherein:
- the core has a first edge and a second edge;
- the first edge and the second edge are positioned apart from each other in a first horizontal direction;
- the coil has a first terminal, a second terminal, a first portion, a second portion, a third portion, a first coupling portion, a second coupling portion, a first extending portion, and a second extending portion;
- the first terminal and the second terminal are positioned apart from each other in a second horizontal direction perpendicular to the first horizontal direction;
- each of the first portion and the second portion is positioned apart from the first edge;
- each of the first portion and the second portion is parallel to the first edge;
- each of the first portion and the second portion is positioned apart from the third portion in the first horizontal direction;
- the first portion has a size in the second horizontal direction;
- the second portion has a size in the second horizontal direction;
- the third portion has a size in the second horizontal direction;
- each of the sizes of the first portion and the second portion is smaller than the size of the third portion;
- the third portion is positioned apart from the second edge;
- the third portion is parallel to the second edge;
- the first coupling portion couples the first terminal and the first portion with each other;
- the second coupling portion couples the second terminal and the second portion with each other;

the first extending portion couples the first portion and the third portion with each other;

the second extending portion couples the second portion and the third portion with each other;

all of the first portion, the second portion, the third portion, the first coupling portion, the second coupling portion, the first extending portion, and the second extending portion are fully embedded in the core;

the first coupling portion extends from the first terminal toward the first edge in the first horizontal direction;

the second coupling portion extends from the second terminal toward the first edge in the first horizontal direction;

the first terminal has a first end and a second end in the first horizontal direction;

the first end of the first terminal is closer to the first edge than to the second edge;

the second end of the first terminal is closer to the second edge than to the first edge;

the first coupling portion extends from the first end of the first terminal;

the second terminal has a first end and a second end in the first horizontal direction;

the first end of the second terminal is closer to the first edge than to the second edge;

the second end of the second terminal is closer to the second edge than to the first edge; and the second coupling portion extends from the first end of the second terminal.

2. The inductor as recited in claim 1, wherein:

the first portion has a first outer end portion and a first inner end portion;

the first coupling portion couples the first outer end portion and the first terminal with each other;

the second portion has a second outer end portion and a second inner end portion;

the second coupling portion couples the second outer end portion and the second terminal with each other;

the third portion has a first end portion and a second end portion;

the first inner end portion is positioned inward of the first end portion in the second horizontal direction;

the first extending portion couples the first inner end portion and the first end portion with each other;

the second inner end portion is positioned inward of the second end portion in the second horizontal direction; and the second extending portion couples the second inner end portion and the second end portion with each other.

3. The inductor as recited in claim 2, wherein:

the first extending portion extends along a first line which connects the first inner end portion and the first end portion with each other, or extends to be bulged outward beyond the first line; and the second extending portion extends along a second line which connects the second inner end portion and the second end portion with each other, or extends to be bulged outward beyond the second line.

4. The inductor as recited in claim 1, wherein each of the first extending portion and the second extending portion extends, at least in part, in a direction intersecting with the first horizontal direction.

5. The inductor as recited in claim 1, wherein the first edge and the second edge extend parallel to each other.

6. An inductor comprising a core and a coil, wherein:

the core has a first edge and a second edge;

the first edge and the second edge are positioned apart from each other in a first horizontal direction;

the coil has a first terminal, a second terminal, a first portion, a second portion, a third portion, a first coupling portion, a second coupling portion, a first extending portion, and a second extending portion;

the first terminal and the second terminal are positioned apart from each other in a second horizontal direction perpendicular to the first horizontal direction;

each of the first portion and the second portion is positioned apart from the first edge;

each of the first portion and the second portion is parallel to the first edge;

each of the first portion and the second portion is positioned apart from the third portion in the first horizontal direction;

the first portion has a size in the second horizontal direction;

the second portion has a size in the second horizontal direction;

the third portion has a size in the second horizontal direction;

each of the sizes of the first portion and the second portion is smaller than the size of the third portion;

the third portion is positioned apart from the second edge;

the third portion is parallel to the second edge;

the first coupling portion couples the first terminal and the first portion with each other;

the second coupling portion couples the second terminal and the second portion with each other;

the first extending portion couples the first portion and the third portion with each other;

the second extending portion couples the second portion and the third portion with each other;

all of the first portion, the second portion, the third portion, the first coupling portion, the second coupling portion, the first extending portion, and the second extending portion are fully embedded in the core;

the first coupling portion extends from the first terminal toward the first edge in the first horizontal direction;

the second coupling portion extends from the second terminal toward the first edge in the first horizontal direction;

over a full length of the third portion, the third portion is positioned apart from the second edge and is parallel to the second edge;

the core has a center in a plane which is defined by the first horizontal direction and the second horizontal direction; and the third portion, the first extending portion, and the second extending portion surround the center of the core.

* * * * *